UNITED STATES PATENT OFFICE.

JACOB SEEGER AND JOHN BOYD, OF BALTIMORE, MARYLAND.

IMPROVEMENT IN PRESERVING AND USING HOPS IN BREWING.

Specification forming part of Letters Patent No. 121,902, dated December 12, 1871.

*To all whom it may concern:*

Be it known that we, JACOB SEEGER and JOHN BOYD, of Baltimore, in the county of Baltimore and State of Maryland, have invented a new and useful Improved Mode of Preserving and Using Hops in the Process of Brewing Malt-Liquors; and we do hereby declare the following to be a full, clear, and exact description of the same.

It is well known that the active principle of hops is soon dissipated and the flavor changed or lost upon exposure to atmospheric action, and that, therefore, fresh hops command in the market two or three fold the price of hops grown the year previous. They are also readily injured by dampness, and their shipment by water is, therefore, attended with risk.

We propose—by grinding or otherwise pulverizing the hops, and by then packing the same in air-tight packages—to secure the following advantages in an improved article of manufacture and trade: First, the bulk is reduced at least fifty per cent. in packing the hops after being pulverized. Second, the hops pulverized and packed in air-tight vessels or packages may be stored for an indefinite length of time without deterioration as to quality, weight, or flavor. Third, the expense and labor of transportation is greatly reduced. Fourth, hops pulverized and packed in air-tight packages may be transported by water-carriage without risk or damage by dampness.

For the purpose of retail trade the pulverized hops are packed in cans or packages holding a pound, more or less, while for the convenience of large consumers, breweries, &c., the packages may be boxes or barrels. In packing pulverized hops the contents of an ordinary bale may be reduced to the dimensions of a flour-barrel, and, therefore, the labor of handling and the expense of transportation will be proportionately reduced.

The large consumer is enabled by our method to store his year's supply without danger of deterioration as to quality, flavor, or weight, and with a material saving as to quantity required and space occupied. The dealer is enabled by our method to handle his hops and to ship them to any market without risk from atmospheric causes or dampness, which now makes a material advance in the price in markets remote from the place of production; or he can hold his stock over and wait an advance in price. This latter fact will tend to equalize prices and relieve the market of a glut at one time or a dearth at another.

The packages may be made air-tight by the use of metal or other impervious material to incase them, and the pulverized material may be compacted under a pressure which would be destructive to the hops in their natural condition. For the convenience of persons using hops in regular definite quantities the packages may be of such size as will just meet the daily requirement, and thus no broken package would remain exposed to the air, even for a day.

In the process of brewing malt-liquors our mode of using hops in a pulverized condition secures the following valuable advantages: First, a given weight of pulverized hops will yield a much larger percentage of the active principle than the same weight of hops in the natural condition. There is, therefore, a material economy in using the pulverized article. Second, the hops, when pulverized, yield the active principle much more readily than when in the natural condition, and, therefore, they do not require so much boiling. The brewer can, therefore, in addition to safe storage and economy of room, dispense with a portion of the quantity which otherwise would be required. Long boiling of the hops in the beer-wort is injurious to the flavor of the liquor, and for that reason brewers generally reserve the larger portion of the hops until the boiling is nearly finished; but as the active principle is not all extracted from the unpulverized hops, except by long boiling, it follows that an increased quantity is required to produce the proper result. But the pulverized hops part with the whole of the active principle in a short time, and it is therefore possible to use the smaller quantity and the shortest boiling, and thus save the full strength of the hops without injury to the flavor of the liquor; and in addition the brewer is enabled by our method to secure not only full strength, but the full natural flavor of his hops at all seasons of the year; and, therefore, he can produce a uniformity in the quality of his liquor, hitherto unattainable.

We are aware that it has long been a domestic practice to pack hops in air-tight vessels to protect them from the action of the air; and that it has heretofore been proposed to put them in air-tight packages for market; but we are not aware that hops have ever before been pulverized as a means of securing greater compactness without an injurious degree of pressure; or as a means of procuring a larger percentage of extract in brewing, and without long boiling.

Having described our invention, what we claim as new is—

1. As a new article of manufacture and trade. hops ground or pulverized and incased in air-tight packages, as and for the purpose set forth.

2. As an improvement in the process of brewing, the described method of using hops—*i. e.*, in a ground or pulverized condition—as set forth.

JACOB SEEGER.
JOHN BOYD.

itnesses:
 R. D. O. SMITH,
 J. C. O. LYONS.

(19)